No. 857,966. PATENTED JUNE 25, 1907.
C. M. THOMPSON.
AUTOMATIC TELEPHONE SWITCH.
APPLICATION FILED JAN. 25, 1907.

2 SHEETS—SHEET 1.

Witnesses
Inventor
Charles M. Thompson
by A. Miller Belfield
Atty

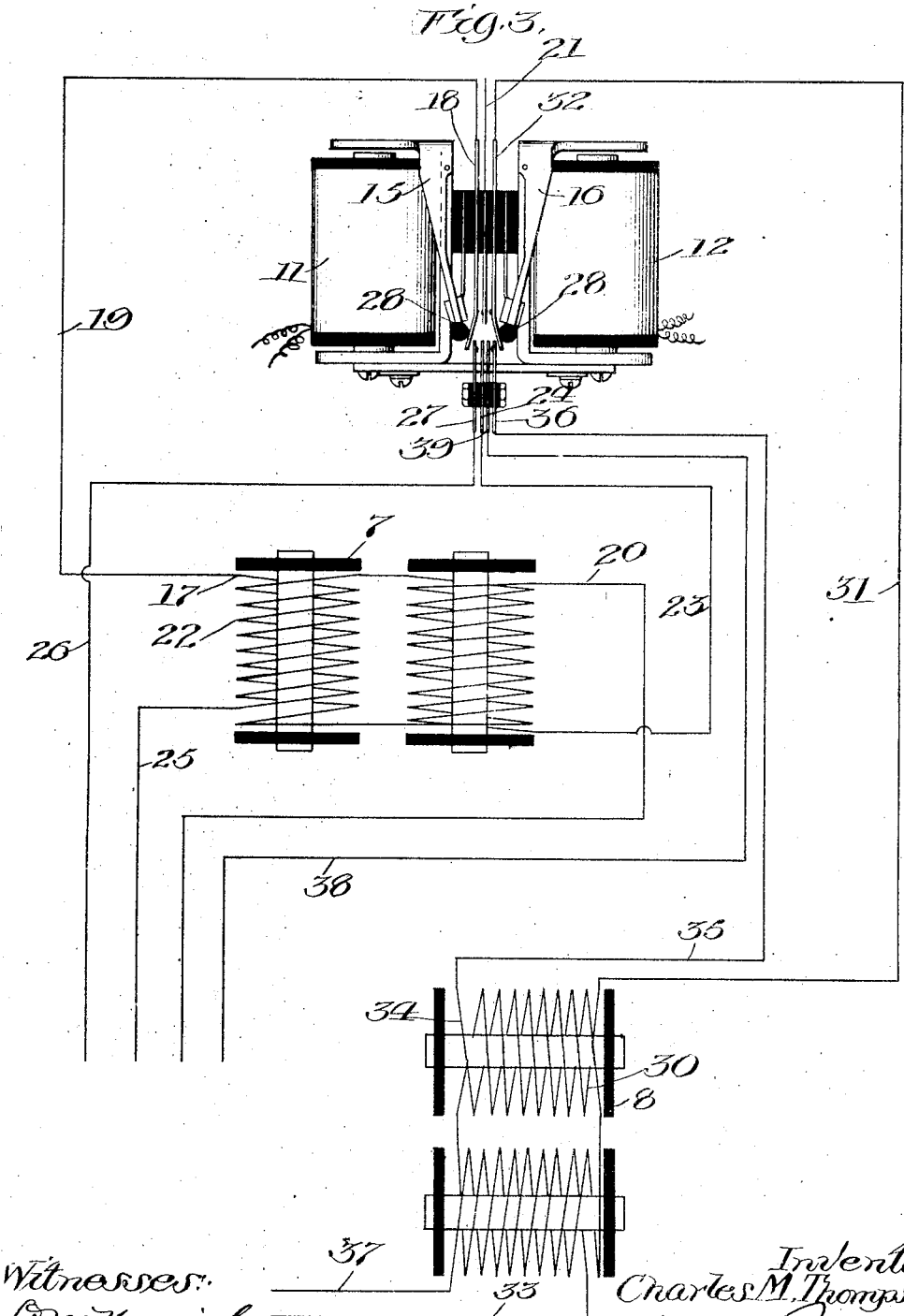

UNITED STATES PATENT OFFICE.

CHARLES M. THOMPSON, OF CHICAGO, ILLINOIS, ASSIGNOR TO CHARLES M. THOMPSON COMPANY, OF CHICAGO, ILLINOIS, A CORPORATION OF ILLINOIS.

AUTOMATIC TELEPHONE-SWITCH.

No. 857,966.

Specification of Letters Patent.

Patented June 25, 1907.

Application filed January 25, 1907. Serial No. 354,005.

*To all whom it may concern:*

Be it known that I, CHARLES M. THOMPSON, a citizen of the United States, residing at Chicago, in the county of Cook and State of Illinois, have invented a certain new and useful Improvement in Automatic Telephone-Switches, of which the following is a full, clear, concise, and exact description, reference being had to the accompanying drawings, forming a part of this specification.

My invention relates to switches for automatic telephone exchanges, and especially to a form of switch embodying motor magnets for operating the switch, included in local circuits at the exchange, and also embodying relays for closing the local circuits containing such motor magnets.

The object of the invention is to prevent sparking at the relay contacts of the local circuit, due to the self-induction of the motor magnets and thereby prevent the necessity of using platinum or other expensive non-corrosive material for contacts.

In carrying out my invention, I provide each motor magnet with two coils of the same size or magnetizing power, and connect these coils with the relay magnet, so that current is first passed through one coil to energize the motor magnet, and then passed through the other coil in the opposite direction to neutralize the first coil and thereby de-energize the magnet. Thus the de-energization of each motor magnet is accomplished by neutralizing it instead of by disconuing current through its circuit and thereby causing a direct spark at the opening of such circuit. The circuits of both the energizing and neutralizing coils are simultaneously opened and as there is no magnetism in the magnet, the two coils neutralizing each other, there is no spark at the opening of their circuits.

Figure 1:
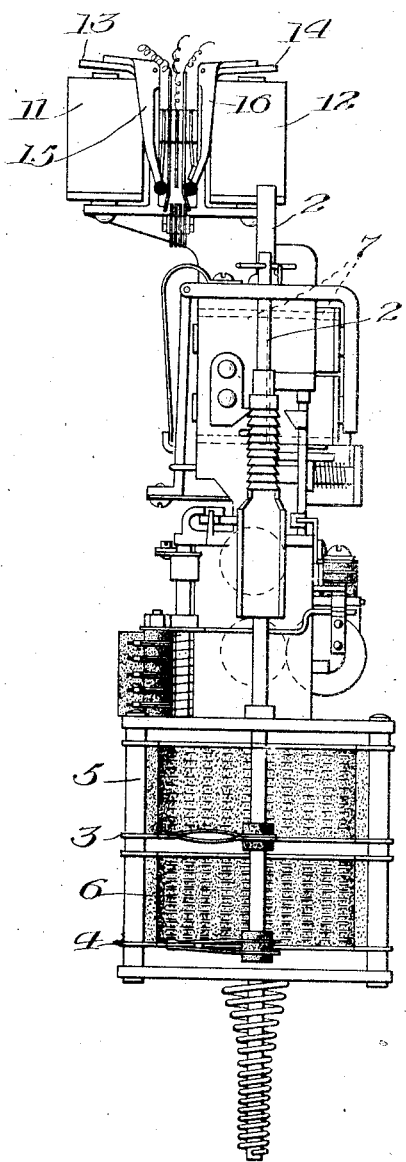
Figure 2:
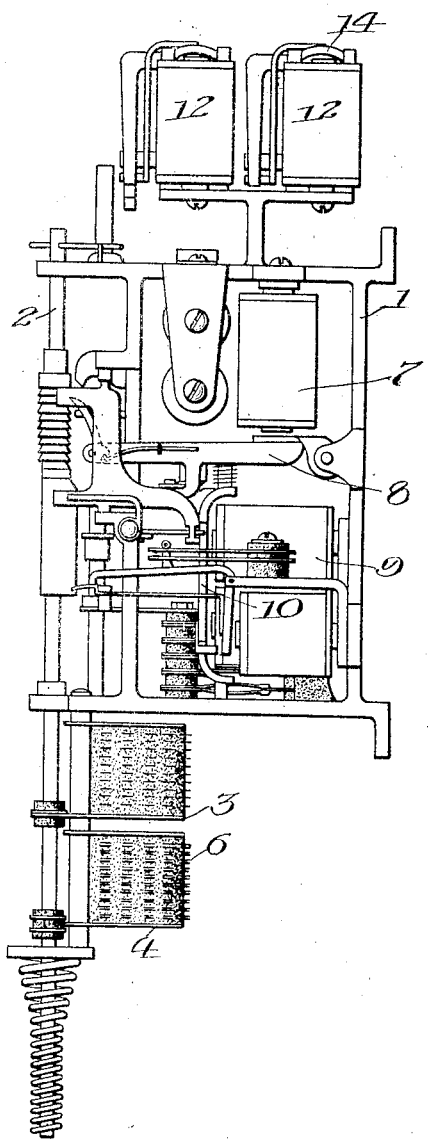

In the accompanying drawings, Figure 1 is a front view of an automatic switch of the Strowger type, having my improved spark-preventing arrangement upon it; Fig. 2 is a side elevation of the same; Fig. 3 is a view showing the relay magnets and motor magnets of the switch, together with their coils and circuit connections in diagram.

Referring first to Figs. 1 and 2, the switch shown comprises the usual Strowger switch, consisting of a frame 1 having a vertically adjustable rotative shaft 2 carrying wipers 3 and 4 co-operating with banks of contacts 5 and 6, so that the connections are made by the elevation and rotation of the shaft 2. The usual vertical magnet 7 is shown co-operating with an armature 8 and elevating mechanism which is arranged to elevate the shaft 2 in a step-by-step manner, but which will not be described in detail here as it forms no part of my present invention and is well known in the art. The rotary magnet 9 is also shown co-operating with an armature 10 which co-operates with mechanism for rotating the shaft 2, which mechanism, however, will not be described here as it forms no part of my present invention and is well known in the art. The vertical relay is shown at 11 and the rotary relay at 12. These relays are provided with armatures 13 and 14 respectively carrying downwardly extending arms 15 and 16.

Referring now to Fig. 3, it will be seen that each of the motor magnets,—that is the vertical magnet 7 and rotary magnet 8,—are provided with two coils which are of the same magnetizing power, as for example being constructed with the same number of turns of the same sized wire. These coils are shown wound in opposite directions, so that when current is passed through them, they will be in opposition, and inasmuch as they are of the same magnetizing power or magnetic inductive capacity, they will neutralize one another when they are both energized with the same sized current. The coil 17 of the vertical magnet 7 is employed as the magnetizing coil, and to such end is connected with a contact strip 18 adjacent to the vertical relay 11, by a conductor 19. The other terminal of this coil is connected by a conductor 20 to the battery and other parts of the switch, and is thence connected back to a middle contact strip 21 between the relays 11 and 12, so that by making contact between the strips 18 and 21, the circuit will be closed through the coil 17 and the magnet 7 energized. The other coil 22 of the magnet 7 is connected by means of a conductor 23 with a contact strip 24 secured in position below the relays 11 and 12 and the other terminal of this coil is connected by a conductor 25 with the same battery with which the energizing coil 17 is connected. The connection then runs back through a conductor 26 to another contact strip 27 alongside of the contact strip 24. The contact strip 18 and the strips 24 and 27 have their ends close together, and the lower end of the strip 18 is adapted to be actuated by an insulating roller 28 on the armature arm 15, so that the contact strip 18 will first make connection with the strip 21 and then at a later instant the strip 27 will be caused to contact with the strip 24. The circuit will therefore be closed first through the energizing coil 17, through the contacts 18 and 21, as a result of which the vertical magnet 7 will be energized. Then the circuit will be closed through the supplementary coil 22 by the contacts 24 and 27, so that the vertical magnet will be neutralized and thereby de-energized. The armature will then return to its original position, releasing all of the contacts at practically the same instant, as a result of which the circuits of both coils will be opened simultaneously, and as they neutralize one another there is no magnetization of the magnet and no self induction and no spark at break.

The arrangement for the rotary magnet 8 is substantially the same. Its main or energizing coil 30 is connected by a conductor 31 with a contact strip 32 and the other terminal of the coil is connected by a contact 33 to battery and other parts of the switch. The other coil 34 of the magnet 8 is connected by a conductor 35 with a contact strip 36 and its other side by a conductor 37 to main battery and thence back by a conductor 38 to a contact strip 39 alongside of the contact strip 24. The contact strip 32 is operated by an insulating roller 28 on the armature arm 16 the same as with the other magnet, so that the circuit is first closed through the main or energizing coil 30 by means of contact strips 21 and 32 and then the supplementary or neutralizing coil is closed by contacts 36 and 39 so as to neutralize the coil 30 and thereby de-energize the magnet. The circuits of the two coils are then simultaneously opened without spark.

It will be understood that changes and modifications can be made without departing from the spirit of the invention.

What I claim is:—

1. The combination with a motor magnet having two opposing windings, of a relay and contacts operated thereby, and circuit connections between the motor magnet and relay, whereby the relay by one and the same actuation closes the circuit first through one winding and then through the other.

2. In an automatic telephone switch, the combination of a motor magnet having two windings and an electromagnetic device combined with means for closing the circuit through both of said windings one after the other by a single operation of said device.

3. The combination of a motor magnet having two windings of the same or substantially the same inductive capacity, of a relay having an armature, and two sets of contacts controlled by said armature, one set of contacts being to close the circuit through one of said windings first, and the other set of contacts being to close the circuit through the other winding at a later time and the two sets of contacts being arranged to be operated to close said windings upon the same stroke of the armature.

4. The combination of a motor magnet having two opposing windings, a relay having an armature, contacts controlled by said relay and arranged to be closed one after the other by the same movement of the relay armature, and telephone switch mechanism actuated by said motor magnet.

5. The combination of vertical and rotary magnets, of an automatic telephone switch, each of said magnets having two opposing windings of substantially the same magnetic inductive capacity, telephone switching mechanism controlled by said magnets, relays combined with contacts, and circuit connections for closing the circuits through said magnets, each of said relays being provided with two sets of contacts for the two windings of the corresponding motor magnet and said contacts being arranged so that the windings of the magnet are closed one after the other by one and the same actuation of the corresponding relay.

In witness whereof, I hereunto subscribe my name this 19th day of January, A. D. 1907.

CHARLES M. THOMPSON.

Witnesses:
J. DAMIEN CANNE,
JOHN R. PENNINGTON